April 27, 1954
C. H. SMOOT ET AL
2,677,123
ELECTRIC INTEGRATING APPARATUS
Filed Nov. 12, 1946
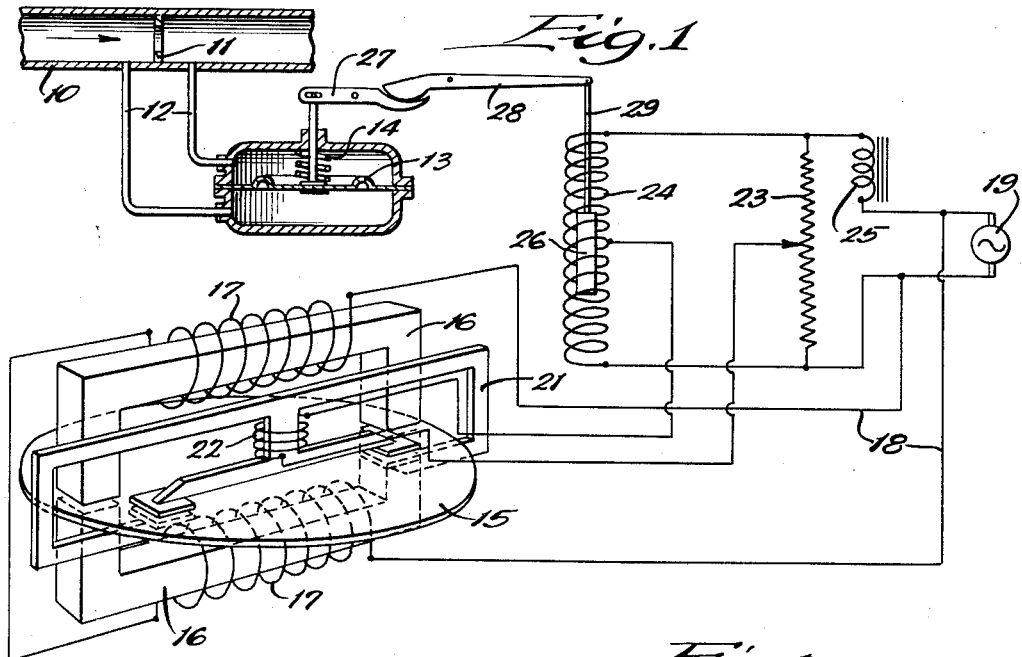
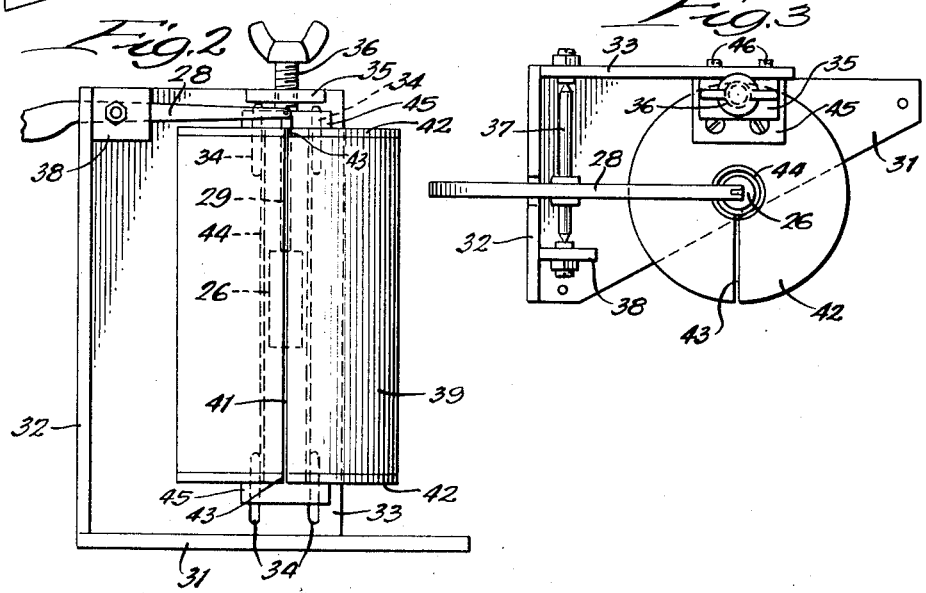
Inventors:
Charles H. Smoot and
Richard W. Landon,
By Dawson, Booth and Spangenberg,
Attorneys.

Patented Apr. 27, 1954

2,677,123

UNITED STATES PATENT OFFICE 2,677,123

ELECTRIC INTEGRATING APPARATUS

Charles H. Smoot, Chicago, and Richard W. Landon, Glencoe, Ill., assignors to Republic Flow Meters Company, Chicago, Ill., a corporation of Illinois Application November 12, 1946, Serial No. 709,392

2 Claims. (Cl. 340—178)

1

This invention relates to electric integrating apparatus and more particularly to electrical apparatus for integrating changes in a condition such, for example, as fluid flow.

One of the objects of the invention is to provide electric integrating apparatus which is fully compensated for variations in both voltage and frequency of a supply source so that an accurate integration is produced.

Another object is to provide electric integrating apparatus in which the speed of the totalizing mechanism is responsive to the output voltage of a bridge circuit whose balance is varied in accordance with changes in the condition. In a preferred construction the bridge circuit comprises resistance and inductance elements with the inductance of the latter elements being varied by moving a core therein in response to changes in the condition. According to a further feature, the input voltage to the bridge circuit is varied by an inductance coil to compensate for changes in frequency.

Still another object is to provide a flow integrating device in which a movable member for controlling balance of a bridge circuit is moved through square root mechanism to produce changes which are linearly related to changes in flow.

A further object is to provide a variable inductance element for an electric integrating apparatus which is adjustable to vary the balance point of the inductance and which can easily be controlled in response to changes in a condition.

The above and other objects and advantages of the invention will be more readily apparent from the following description when read in connection with the accompanying drawing, in which—

Figure 1 is a diagrammatic view of a flow integrating apparatus embodying the invention;

Figure 2 is a front elevation of the bridge inductance element; and

Figure 3 is a top plan view of the apparatus of Figure 2.

The apparatus as shown in Figure 1 is adapted to integrate the flow through a conduit 10 having a restricted orifice 11 therein. The conduit on opposite sides of the orifice is connected through pipes 12 to the opposite sides of a diaphragm 13 which is urged in one direction by a spring 14 so that the diaphragm will be moved in proportion to the differential pressure across the orifice.

The integrating apparatus comprises an electrical totalizing mechanism which may be of the type more particularly described and claimed in the patent to Freeman, No. 1,768,553. As shown, this apparatus comprises a rotatably mounted disc 15 of conducting material which is symmetrically placed between the poles of electro magnets having cores 16 and series connected windings 17. The windings 17 are connected through wires 18 to an alternating current source indicated at 19.

A second magnetic core 21 is mounted adjacent the unit having poles on opposite sides of the disc 15 closely adjacent the poles of the cores 16. The core 21 carries a winding 22 which may be variably energized to control rotation of the disc.

As more fully explained in Freeman Patent No. 1,768,553, the flux produced by the opposite poles of the cores 16 and that produced by the core 21 constitutes the accelerating flux for the disc 15. The retarding force is responsive entirely to the flux produced by the cores 16 so that the speed of rotation of the disc will be entirely dependent upon variations in the flux produced in the core 21 which is in turn proportional to the current in the winding 22.

To regulate the current in the winding 22 a variable supply circuit is provided shown as including a bridge circuit having two adjacent legs formed by a center tapped resistor 23, and the opposite legs formed by a center tapped inductance coil 24. The resistor and the coil are connected in parallel to the source 19, preferably through an iron core inductance 25 to compensate for frequency variations. Balance of the bridge circuit is varied by a magnetic core 26 substantially shorter than the coil 24 and movable in the coil.

In the flow meter apparatus illustrated in Figure 1 the core 26 is adapted to be moved by the diaphragm 13. Since the diaphragm will move in proportion to the square of the flow, a square root mechanism is preferably employed to connect the diaphragm to the core so that changes in balance of the bridge circuit will be linearly related to flow changes. As shown, the square root mechanism comprises a lever 27 connected at one end to the diaphragm 13 and having its opposite end cam shaped to engage a cam shaped extension on the end of a second lever 28. The free end of the lever 28 overlies the axis of the coil 24 and is connected to the core 26 by a link 29.

In operation with the core 26 in the center of the coil the bridge will be balanced and there will be no voltage applied to the winding 22 so that the disc 15 will be stationary. The apparatus may be adjusted so that this condition will prevail when there is no flow through the conduit. As flow through the conduit occurs, the diaphragm 13 will be moved upward so that the core 26 will be elevated in the coil and a voltage will be applied to the winding 22 to cause the disc 15 to turn. If there should be a change in voltage at the source, it will affect the bridge circuit and the windings 17 equally so that rotation of the disc will not be influenced. Upon a change in frequency at the source, the inductance of the coil 25 will be correspondingly changed to produce a change in voltage applied across the bridge circuit so that its output voltage will be changed. At the same time, a frequency change affects the windings 17 in the opposite manner so that rotation of the disc will not be influenced by changes in frequency.

The physical construction of the variable inductance with its movable core forming a part of the bridge circuit is shown in Figures 2 and 3. As illustrated in these figures the construction includes a support or frame having a base plate 31 to which is secured a side upright plate 32 and a back plate 33. The back plate has pairs of elongated slots 34 therein, and at one end is formed with an outwardly extending flange 35 carrying a wing screw 36. A shaft 37 is pivoted between the back plate 33 and a bracket 38 on the side plate 32 which carries the pivoted lever 28.

The coil 24 includes an outer cylindrical casing 39 of steel or like magnetic material which is split up one side as shown at 41 to eliminate eddy currents. The ends of the shell are closed by magnetic end plates 42 radially split at 43 with the splits therein registering with the split 41 in the casing. A central tube 44 of non-magnetic material extends axially through the casing and in the case of conducting material such as brass is split in register with the splits 43 and 41. This construction completely eliminates eddy currents.

The magnetic core 26 is slidable axially through the tube 44 and is preferably of a smaller diameter than the tube, as shown. We have found that the effect of the fields induced by the winding 24 which is located in the casing around the tube 44 will maintain the core 26 substantially centered in the tube so that no horizontal guide for the core is necessary. The core can, therefore, be supported from a simple link or strand such as 29 extending from the end of the lever 28 to the core.

The casing is adapted to be mounted on the back plate 33 by means of mounting blocks 45 secured to the opposite ends of the casing. The blocks are adapted to receive screws 46 which extend through the slots 34 to secure the casing to the back plate so that it can be adjusted vertically to locate the core 26 centrally of the winding to set the instrument to zero. The wing nut 36 engages the upper block 45 and can be turned to provide an adjustable upper stop for accurate adjustment of the casing.

While one embodiment of the invention has been shown and described in detail herein, it will be understood that this is illustrative only and is not to be taken as a definition of the scope of the invention, reference being had for this purpose to the appended claims.

What is claimed is:

1. Electric integrating apparatus comprising a plurality of electro magnets, a rotor arranged to move through the fields of the magnets, one of the magnets being connected to an alternating current source, a bridge circuit, means including an inductance coil in series connecting opposite corners of the bridge circuit to the source, means connecting the remaining corners of the bridge circuit to another of the magnets, and means responsive to a condition to be integrated to vary the balance of the bridge circuit thereby to vary the effect of said other of the magnets.

2. Electric integrating apparatus comprising a plurality of electro magnets, a rotor arranged to move through the fields of the magnets, one of the magnets being connected to an alternating current source, a bridge circuit including a resistor and an inductance coil connected in parallel with each other and across the source, means connecting another of the magnets to the mid points of the resistor and the coil, an inductance coil in series between the bridge circuit and the source to compensate for changes in frequency, and a magnetic core shorter than the coil movable in the coil in response to changes in a condition to be integrated to change the balance of the bridge circuit.

References Cited in the file of this patent

UNITED STATES PATENTS

| Number | Name | Date |
|---|---|---|
| 1,668,457 | Kath | May 1, 1928 |
| 1,768,553 | Freeman | July 1, 1930 |
| 1,891,156 | Harrison | Dec. 13, 1932 |
| 2,064,772 | Vogt | Dec. 15, 1936 |
| 2,151,941 | Rydberg | Mar. 28, 1939 |
| 2,255,601 | Schmitt | Sept. 1, 1941 |
| 2,431,722 | Xenis et al. | Dec. 2, 1947 |
| 2,457,700 | Martin et al. | Dec. 28, 1948 |
| 2,511,178 | Roters | June 13, 1950 |
| 2,518,797 | Landon | Aug. 15, 1950 |

FOREIGN PATENTS

| Number | Country | Date |
|---|---|---|
| 621,363 | France | Feb. 5, 1927 |
| 738,445 | France | Oct. 17, 1932 |
| 567,195 | Great Britain | Feb. 1, 1945 |